(12) United States Patent
Blecon et al.

(10) Patent No.: US 9,143,470 B2
(45) Date of Patent: Sep. 22, 2015

(54) COACHING WITH COLLABORATIVE EDITING

(71) Applicants: Stéphane Blecon, Bohars (FR); Boris Nicolas, Gouesnou (FR)

(72) Inventors: Stéphane Blecon, Bohars (FR); Boris Nicolas, Gouesnou (FR)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 262 days.

(21) Appl. No.: 13/753,415

(22) Filed: Jan. 29, 2013

(65) Prior Publication Data
US 2014/0214975 A1 Jul. 31, 2014

(51) Int. Cl.
*G06F 15/16* (2006.01)
*H04L 12/58* (2006.01)

(52) U.S. Cl.
CPC ............. *H04L 51/04* (2013.01); *H04L 51/046* (2013.01); *H04L 51/00* (2013.01)

(58) Field of Classification Search
CPC ........ H04L 51/04; H04L 51/00; H04L 12/581
See application file for complete search history.

(56) References Cited

U.S. PATENT DOCUMENTS

| | | | |
|---|---|---|---|
| 8,856,237 B2 * | 10/2014 | Spataro et al. | 709/205 |
| 2003/0070176 A1 * | 4/2003 | Parker et al. | 725/105 |
| 2006/0168073 A1 * | 7/2006 | Kogan et al. | 709/206 |
| 2008/0222533 A1 | 9/2008 | Hankejh et al. | |
| 2010/0151431 A1 * | 6/2010 | Miller | 434/350 |
| 2010/0257457 A1 | 10/2010 | De Goes | |
| 2011/0231488 A1 * | 9/2011 | Xu | 709/204 |
| 2013/0070045 A1 * | 3/2013 | Meek | 348/14.07 |
| 2013/0198290 A1 * | 8/2013 | Thomas | 709/205 |

FOREIGN PATENT DOCUMENTS

| | | |
|---|---|---|
| JP | 2002-99612 A | 4/2002 |
| JP | 2002-269020 A | 9/2002 |
| WO | WO 2014/120836 A1 | 8/2014 |

OTHER PUBLICATIONS

English translation of JP 2002-99612 A, Apr. 5, 2002, Yuji Tamura, 9 pages.*
International Search Report for PCT/US2014/013686, mailed on Jun. 2, 2014, 4 pages.

* cited by examiner

*Primary Examiner* — Krisna Lim
(74) *Attorney, Agent, or Firm* — Christie, Parker & Hale, LLP

(57) ABSTRACT

A method has acts for coupling from a computerized server executing software on a processor from a non-transitory medium to two or more computerized appliances operated by persons in a contact center, and updating text composition and editing results in real time in a display of each of the computerized appliances as any person operating a coupled computerized appliance composes or edits in a text-based communication application.

20 Claims, 4 Drawing Sheets

COACHING WITH COLLABORATIVE EDITING

FIELD

The disclosure generally relates to the technical area of contact centers and pertains more particularly to effective ways to coach and train agents.

BACKGROUND

Contact centers employ agents who may interact with customers on behalf of an enterprise host of the contact center. Examples of enterprise hosts are financial institutions and airlines. Some contact center operations are quite large, employing many agents, and there is always a challenge of training new agents and helping to upgrade skills of existing agents. At the time of filing the instant application there are many problems with the way agents are coached and trained, and new methods are desirable.

SUMMARY

An aspect of an embodiment of the present invention is directed toward situations in which an agent is corresponding with a customer electronically, e.g., by email, chat, IM, or the like. In such situations, it may be helpful for the agent's supervisor to be able to participate in various roles, including providing text or editing the agent's text compositions without the customer's knowledge, or providing separate feedback which the customer may see to be generated by a different person from the agent.

According to an embodiment of the present invention there is provided a method, including: coupling a computerized server to two or more computerized appliances operated by persons in a contact center; and updating text composition and editing results in real time in a display of each of the computerized appliances as any person operating a coupled computerized appliance composes or edits in a text-based communication application.

In one embodiment, the method includes: coupling the computerized appliances to an interaction server providing functionality for one or more of instant messaging, chat, email, or other text-based medium; and enabling individual ones of the computerized appliances to prepare, edit, send and receive messages in a medium supported by the interaction server.

In one embodiment, one of the persons is an agent operating in a contact center, and another of the persons is a supervisor responsible for supervising training for the agent, the method further including: receiving from the supervisor changes in text of messages being prepared by an agent as the agent composes the text, the changes providing corrective feedback to the agent.

In one embodiment, the method includes: enabling chat functionality for a coupled computerized appliance operated by the agent and for a coupled computerized appliance operated by the supervisor, wherein the supervisor see all text composition and editing by the agent; and providing a mechanism in a chat display for the supervisor to initiate a collaborative mode in which the supervisor is enabled to compose text and provide text amendments as well as the agent, with all compositions and edits rendered in displays for computerized appliances operated by either the agent or the supervisor being updated in real time in both chat displays.

In one embodiment, the method includes: providing in a chat display on the coupled computerized appliance operated by the supervisor a selectable coaching mode wherein the supervisor's text amendments are visible to the agent, and not to a customer.

In one embodiment, the method includes: providing in a chat display on the coupled computerized appliance operated by the supervisor a selectable barge-in mode, wherein the supervisor's text amendments are visible to the agent and to a customer.

In one embodiment, the method includes: enabling email functionality for a coupled computerized appliance operated by the agent and for a coupled computerized appliance operated by the supervisor, wherein the supervisor is enabled to see all text composition and editing by the agent; and providing a mechanism in an email display for the supervisor to initiate a collaborative mode in which the supervisor is enabled to compose text and provide text amendments as well as the agent, with all compositions and edits rendered in email displays for computerized appliances operated by either the agent or the supervisor being updated in real time in both displays.

In one embodiment, the method includes: providing in an email display on the coupled computerized appliance operated by the supervisor a selectable coaching mode wherein the supervisor's text amendments are visible to the agent, and not to a customer.

In one embodiment, the method includes: providing in an email display on the coupled computerized appliance operated by the supervisor a selectable barge-in mode, wherein the supervisor's text amendments are visible to the agent and to a customer.

In one embodiment, the method includes: enabling instant messaging (IM) functionality for a coupled computerized appliance operated by the agent and for a coupled computerized appliance operated by the supervisor, wherein the supervisor is enabled to see all text composition and editing by the agent; and providing a mechanism in the instant messaging display for the supervisor to initiate a collaborative mode in which the supervisor is enabled to compose text and provide text amendments as well as the agent, with all compositions and edits rendered in displays for computerized appliances operated by either the agent or the supervisor being updated in real time in both IM displays.

In one embodiment, the method includes: providing in an IM display on the coupled computerized appliance operated by the supervisor a selectable coaching mode wherein the supervisor's text amendments are visible to the agent, and not to a customer.

In one embodiment, the method includes: providing in an IM display on the coupled computerized appliance operated by the supervisor a selectable barge-in mode, wherein the supervisor's text amendments are visible to the agent and to a customer.

According to an embodiment of the present invention there is provided an apparatus, including: a processor and a memory, the memory storing instructions that when executed by the processor, cause the processor to: couple two or more computerized appliances operated by persons in a contact center; and update text composition and editing results in real time in a display of each of the computerized appliances as any person operating a coupled computerized appliance composes or edits in a text-based communication application.

In one embodiment, the apparatus includes: an interaction server configured to provide functionality for one or more of instant messaging, chat, email, or other text-based medium; and the apparatus configured to enable individual ones of the computerized appliances to prepare, edit, send and receive messages in a medium supported by the interaction server.

In one embodiment, the first person is an agent operating in a contact center, and the second person is a supervisor responsible for supervising training for the agent, further configured to allow the supervisor to make changes in text of messages being prepared by an agent as the agent composes the text, the changes providing corrective feedback to the agent.

In one embodiment, the supervisor is enabled to see all text composition and editing by the agent; and provide a mechanism in a chat display for the supervisor to initiate a collaborative mode in which the supervisor is enabled to compose text and provide text amendments as well as the agent, with all compositions and edits rendered in displays for computerized appliances operated by either the agent or the supervisor being updated in real time in both chat displays.

In one embodiment, the supervisor's text amendments are visible to the agent, and not to a customer.

In one embodiment, the supervisor's text amendments are visible to the agent and to by a customer.

In one embodiment, the supervisor is enabled to see all text composition and editing by the agent; and provide a mechanism in an email display for the supervisor to initiate a collaborative mode in which the supervisor is enabled to compose text and provide text amendments as well as the agent, with all compositions and edits rendered in email displays for computerized appliances operated by either the agent or the supervisor being updated in real time in both displays.

In one embodiment, the supervisor's text amendments are visible to the agent, and not to a customer.

In one embodiment, the supervisor's text amendments are visible to the agent and to by a customer.

In one embodiment, the supervisor is enabled to see all text composition and editing by the agent; and provide a mechanism in the instant messaging display for the supervisor to initiate a collaborative mode in which the supervisor is enabled to compose text and provide text amendments as well as the agent, with all compositions and edits rendered in displays for computerized appliances operated by either the agent or the supervisor being updated in real time in both IM displays.

In one embodiment, the supervisor's text amendments are visible to the agent, and not to a customer.

In one embodiment, the supervisor's text amendments are visible to the agent and to by a customer.

DETAILED DESCRIPTION

Figure 1:
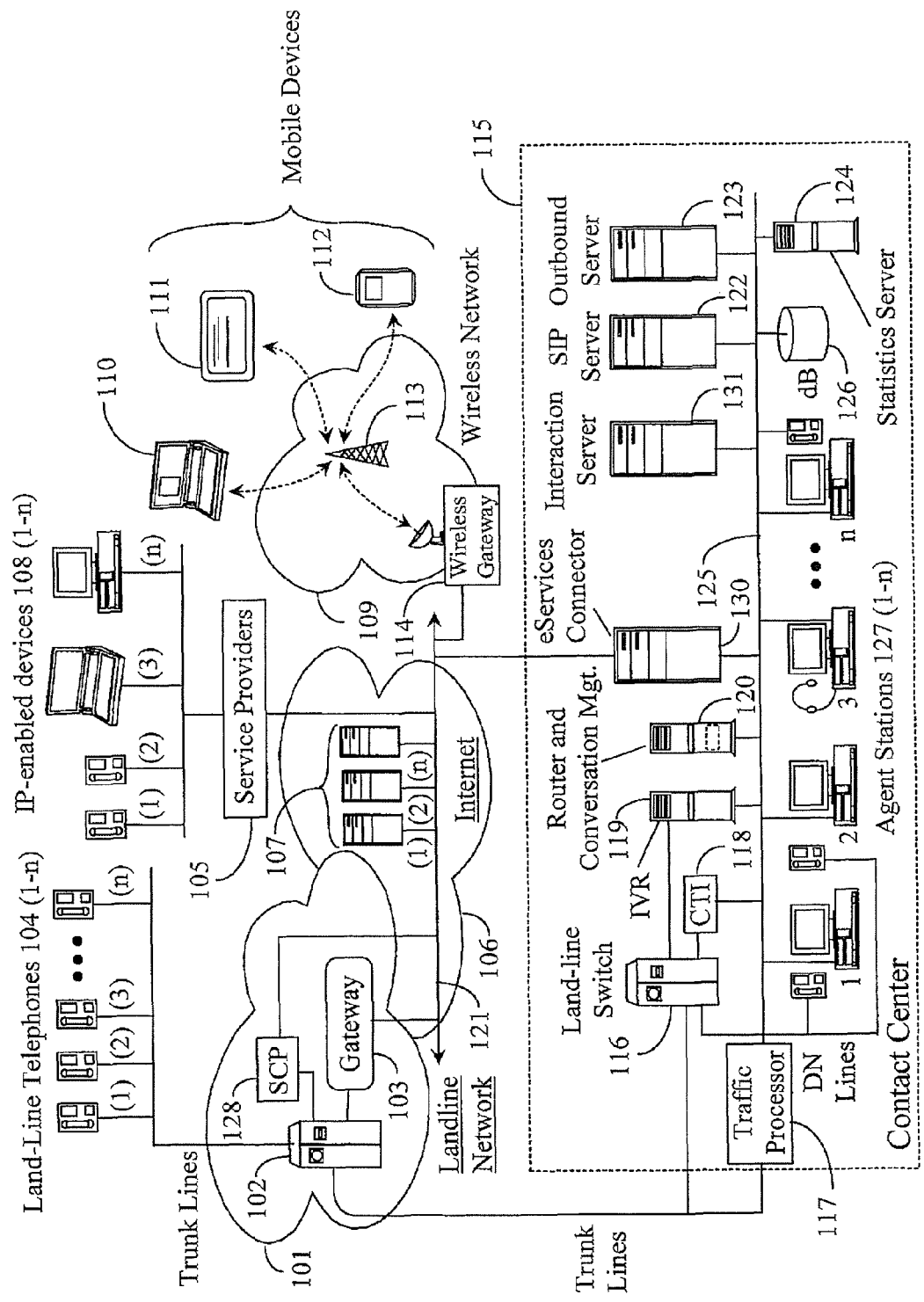
FIG. 1 is an architecture diagram illustrating a contact center and interconnection of networks facilitating interaction between customers and agents in the contact center.

FIG. 1 is a diagram illustrating a contact center 115 and a plurality of networks with interconnections whereby customers and remote agents may interact with the contact center. Customers and agents may interact with contact center 115 through communication appliances such as land-line telephones 104 (1-n), IP-enabled devices 108 (1-n), or through mobile appliances 110, 111 or 112. In some circumstances interaction may be limited to voice, but in other circumstances interaction my include text interaction, such as, for example, email, messaging services, chat, and so on.

Persons interacting through land-line telephones 104 may connect firstly over trunk lines as shown to a network switch 102. Switch 102 may interact with hardware and software of a Service Control Point (SCP) 128, which may execute intelligent operations to determine to connect an incoming call to different ones of possible contact centers or to route an incoming call directly to an agent in a contact center or to an agent operating as a remote agent outside a contact center premises. Incoming calls in some circumstances may also be routed through a gateway 103 into the well-known Internet network 106 as packet-switched calls. The interconnections in the Internet are represented by backbone 121. In this circumstance such a call may be further processed as a packet-switched IP call. Equipment providing SCP services may also connect to the Internet and may allow SCP functionality to be integrated with Internet-connected servers and intelligence at contact centers.

A call from a land-line telephone 104 connecting to switch 102 may be routed to contact center 115 via trunk lines as shown to either a land-line switch 116 in contact center 115 or to a Traffic Processor 117. A contact center 115 may operate with just one of the land-line switch or the traffic processor, but in some circumstances may employ both incoming paths. Traffic processor 117 may provide Session Border Control (SBC) functionality, may operate as a Media Gateway, or as a Softswitch.

Persons interacting through IP-enabled devices 108 (1-n) may interact through the Internet network via backbone 121, enabled by a variety of service providers 105 which operate to provide Internet service for such devices. Devices 102(1) and 102(2) may be IP-enabled telephones, operating under a protocol such as Session Initiation protocol (SIP). Appliance 108(3) is illustrated as a lap-top computer, which may be enabled by software for voice communication over packet networks such as the Internet, and may also interact in many other ways, depending on installed and operable software, such as SKYPE™ or other VoIP solutions based on technologies such as WebRTC. Similarly appliance 108(n) illustrated as a desktop computer, may interact over the Internet in much the same manner as laptop appliance 108(3).

Many IP-enabled devices provide capability for users to interact both in voice interactions and text interactions, such as email and text messaging services and protocols. Internet 106 may comprise a great variety of Internet-connected servers 107 and IP-enabled devices with Internet access may connect to individual ones of such servers to access services provided. Servers 107 in the Internet may comprise email servers, text messaging servers, social networking servers, Voice over IP servers (VoIP), and many more, many of which users may leverage in interaction with a contact center such as contact center 115.

Another arrangement by which users and agents may interact with contact centers is through mobile devices, illustrated in FIG. 1 by devices 110, 111 and 112. Such devices may include, but are not limited to laptop computers, iPad devices and smart telephones. Such devices are not limited by a land-line connection or by a hard-wired Internet connection as shown for telephones 104 or IP-enabled devices 108, and may be used by customers and agents from changing geographic locations and while in motion. Devices 110, 111 and 112 are illustrated in FIG. 1 as connecting through a wireless network 109, which may occur through individual ones of cell towers 113 associated with base stations having gateways such as gateway 114 illustrated, the gateways connected to Internet backbone 121.

In some circumstances mobile devices such as devices 110, 111 and 112 may connect to supplemental equipment operable in a moving vehicle. For example, cellular smartphones may be enabled for near-field communication such as BLUETOOTH™, and may be paired with equipment in an automobile, which may in turn connect to the Internet network through satellite equipment and services, such as ON-STAR™. Wireless communication may be provided as well in aircraft, which may provide an on-board base station, which may connect wirelessly to the Internet through either a series of ground stations over which an aircraft may pass in flight, or through one or more satellites.

Regardless of the variety of ways that Internet access may be attained by mobile devices, users of these devices may leverage Internet-connected servers for a great variety of services, or may connect through the Internet more directly to a contact center such as contact center 115, where users may interact as customers or as agents of the contact center.

Contact center 115, as described above, may represent one of a plurality of federated contact centers, a single center hosted by a single enterprise, a single contact center operating on behalf of a plurality of host enterprises, or any one of a variety of other arrangements. Architecture of an individual contact center 115 may also vary considerably, and not all variations may be illustrated in a single diagram such as FIG. 1. The architecture and interconnectivity illustrated in FIG. 1 is exemplary.

Equipment in a contact center such as contact center 115 may be interconnected through a local area network (LAN) 125. Land-line calls may arrive at a land-line switch 116 over trunk lines as shown from land-line network 101. There are a wide variety of land-line switches such as switch 116, and not all have the same functionality. Functionality may be enhanced by use of computer-telephony integration (CTI), which may be provided by a CTI server 118, which may note arriving calls, and may interact with other service units connected to LAN 125 to route the calls to agents connected to LAN 125, or in some circumstances may route calls to individual ones of remote agents who may be using any of land-line telephones 104, IP-enabled devices 108 or mobile devices represented by devices 110, 111 or 112. Calls may be queued in any one of a variety of ways before connection to an agent, either locally-based or remote from the contact center, depending on circumstances.

Incoming calls to switch 116 may also be connected to an IVR server 119, which may serve to ascertain purpose of the caller and other information useful in further routing of the call to final connection or termination at an IVR. A router and conversation manager server 120 may be leveraged for routing intelligence, of which there may be a great variety, and for association of the instant call with previous calls or future calls that might be made.

Land-line calls thusly treated may be connected to agents at agent stations 127(1) or 127(2), each of which is shown as comprising a land-line telephone connected to switch 116 by destination number (DN) lines. Such calls may also be connected to remote agents using land-line telephones back through the land-line network. Such remote agents may also have computing appliances connected to call center 115 for interaction with agent services such as scripting through an agent desktop application, also used by agents at agent stations 127.

Incoming calls from land-line network 101 may alternatively be connected in contact center 115 through Traffic Processor 117, described briefly above, to LAN 125. In some circumstances Traffic Processor 117 may convert incoming calls to SIP protocol, and such calls may be further managed by SIP Server 122.

Incoming calls from IP-enabled devices 108 or from mobile devices 110, 111 or 112, and a wide variety of text-based electronic communications may come to contact center 115 through the Internet, arriving in the Contact Center at an eServices Connector 130. eServices Connector 130 may provide protective functions, such as a firewall may provide in other architectures, and may serve to direct incoming transactions to appropriate service servers. For example, SIP calls may be directed to SIP Server 122, and text-based transactions may be directed to an Interaction Server 131, which may manage email, chat sessions, Short Message Service (SMS) transactions, co-browsing sessions, and more. Interaction Server 131 may leverage services of other servers in the contact center, and available remotely as well.

Agent station 127(3) is illustrated as having a connected headset from a computing device, which may execute telephony software to interact with packet switched calls. Agent station 127(n) is illustrated as having an IP-enable telephone connected to LAN 125, through which an agent at that station may connect to packet-switched calls. Every agent station may have a computerized appliance executing software to enable the using agent to transact by voice, email, chat, instant messaging, and any other known communication process.

A statistics server 124 is illustrated in contact center 115, connected to LAN 125, and may provide a variety of services to agents operating in the contact center, and in some circumstances to customers of the contact center. Statistics may be used in contact center management to vary functionality in routing intelligence, load management, and in many other ways. A dB 126 may be provided to archive data and to provide temporary storage for many of the activities in contact center 115. An outbound server 123 is illustrated and may be used to manage outbound campaigns in the contact center, wherein calls may be made to destinations from a campaign list, and answered calls may be connected directly or be queued to be connected to agents involved in the outbound campaigns.

As described above, contact center 115, and the architecture and connectivity of the networks through which transaction is accomplished between customers and agents are exemplary, and there are a variety of ways that similar functionality might be attained with somewhat different architecture. The architecture illustrated is exemplary.

Contact centers may operate with a wide variety of media channels for interaction between agents and customers who call in to the centers. Such channels may enable voice interaction in some instances, and in other instances text-based interaction, which may include chat sessions, email exchanges, and text messaging. Solutions proposed by implementation in this application may be particularly applicable to text-based communication.

The nature of text-based exchanges is such that, before the present disclosure, coaching may be limited to review by a coach after interaction takes place or after a text message is fully developed. Correction may be made by the coach after the fact, and provided to the agent as feedback for a learning experience. Some problems are that there may be no immediate feedback to agents who make errors. Agents may make multiple mistakes before getting feedback. Further, agents may send poorly prepared messages to customers before correction can be made. In such coaching situations there is no real-time or near real-time correction before the present teaching Such problems and limitations are common in training of agents in all text-based interaction channels.

Previously existing solutions are highly dependent on type of media employed.

Generally, independently of media type, agents may have an ability to send requests for help to coaches or supervisors, and proceed in interaction after help is attained.

For email and Short Message Service (SMS) in paging mode, a Supervisor may have an ability to review email messages or text page documents prepared by the agent before the same may be sent to the customer. If a message is wrongly prepared, the supervisor may fix it, send it to the customer, and communicate with the agent to explain what was wrong, or may send a copy of the corrected email or other document to the agent as well to help instruct the agent how to compose such documents in future interactions. This sort of coaching process may be quite heavy requiring many exchanges between the agent and the coach, and between the agent and the customer. As correction is not immediate the learning curve for the Agent may be quite lengthy.

For chat sessions, Instant Messaging (IM), and SMS in session mode, a supervisor may enter a chat conversation between a customer and an agent. The supervisor's messages may either be visible to the agent only, or to both the agent and the customer.

But there is still no real-time sharing of the information. For example, the supervisor may see the agent message to the customer only after it is sent by the agent, too late to make any modification. Also, the supervisor becomes visible in the interaction. There is before the present disclosure no way for the supervisor or coach to send a message in place of the agent.

Application sharing has been considered as a possible solution. In this process the agent would share his desktop or his call center application with the supervisor, perhaps using an existing tool such as NETMEETING™, MICROSOFT OFFICE™ COMMUNICATOR™, or MYTEAMWORK™ from ALCATEL™-LUCENT™. With this approach the supervisor may take control of the desktop over the Agent. But only the supervisor or the agent may have control at any time. This potential solution does not allow integration with the application to limit control to some area or functionality of the agent application for example. Further still coaching multiple agents simultaneously may be complex, because on supervisor side, the supervisor may see both his own application and the agent application. Coaching several agents requires the supervisor to follow too many sessions simultaneously.

Figure 2:
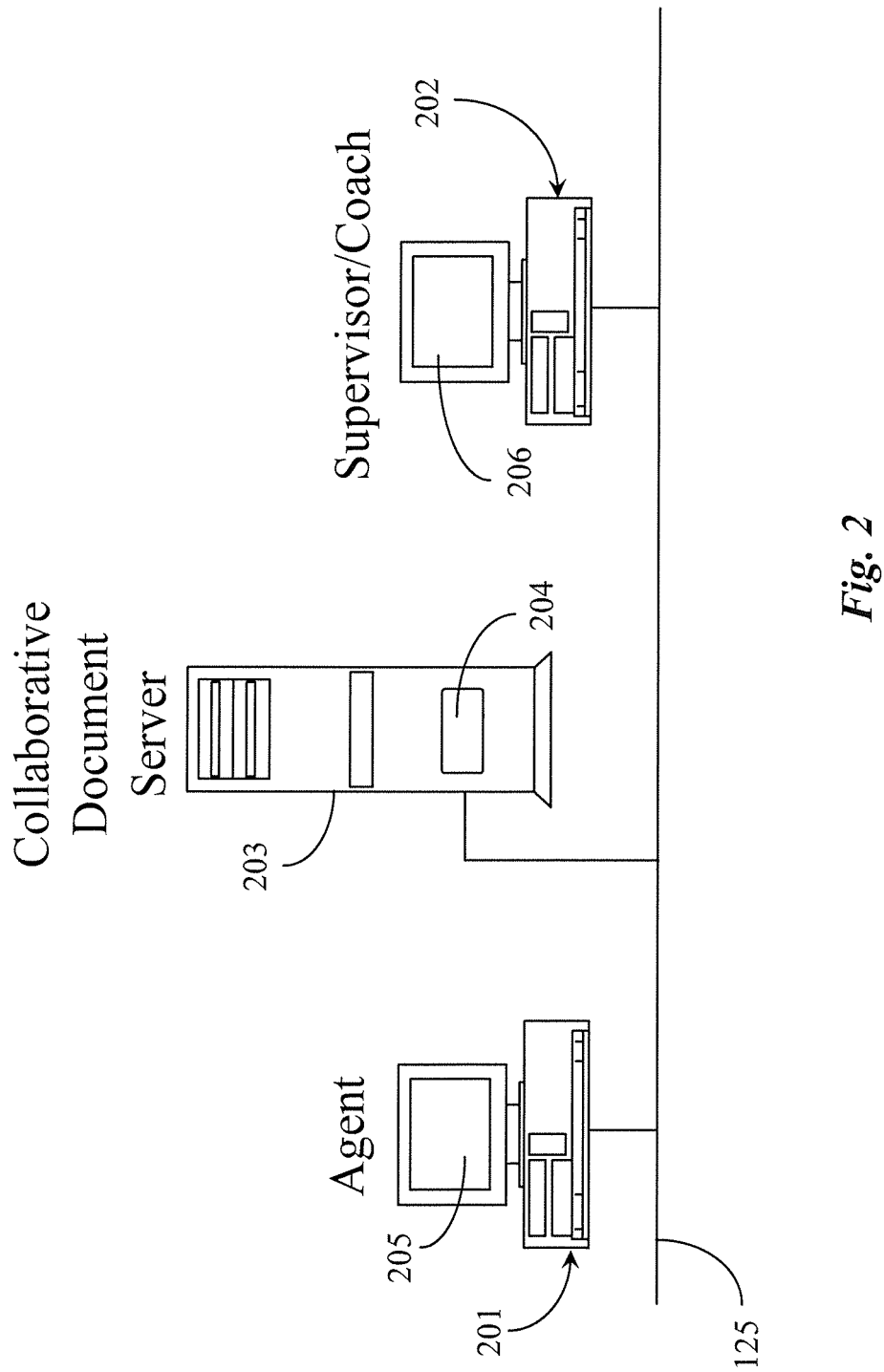
FIG. 2 is an architecture diagram illustrating a portion of the infrastructure in contact center 115 of FIG. 1.

FIG. 2 is an architecture diagram illustrating a portion of LAN 125 in contact center 115 of FIG. 1. A computerized appliance 201 having a display 205 is shown connected to LAN 125 for use by an agent, and another computerized appliance 202 having a display 206 is shown connected to LAN 125 for use by a supervisor coach who may be responsible for supervision and training of the agent using appliance 201. Stations connected to LAN 125 for use by agents, knowledge workers and supervisors may have telephones or other equipment also connected to the LAN or directly to the computerized appliance enabling voice communication between customers, agents and others. As an important application of implementations provided in the instant disclosure deals with text-based interaction, the computerized appliances having displays are considered sufficient for description.

In particular, a computerized server may be coupled to two computerized appliances in a contact center operated by an agent and by a supervisor respectively. The computerized server may contain software stored on a non-transitory medium and the computerized server may execute software on a processor to update text compositions and editing results in real time in a display of each of the computerized appliances. In one embodiment the computerized server may also be coupled to an interaction server providing functionality for one or more of instant messaging, chat, email, or other text-based medium; and enabling individual ones of the computerized appliances to prepare, edit, send and receive messages in a medium supported by the interaction server. The supervisor may be able to initiate various interaction modes, including a coaching mode, in which the supervisor's text amendments are not seen by the customer, and a barge-in mode, in which the supervisor's text amendments are seen by the customer, and the supervisor's inputs may provide corrective feedback to the agent.

Appliances 201 and 202 may be other than desktop computers. These appliances may be pad-type appliances, smart telephones, laptop computers or any other sort of appliance capable of interaction in chat, email, instant messaging and any other text-based interaction. The computer icon shown in FIG. 2 is merely for convenience.

A Collaborative Document Server 203 having a processor 204 is shown connected to LAN 125, and both appliances 201 and 202 may interact with server 203 via LAN 125. Collaborative Document Server 203 may execute as a standalone hardware and software, or may be a part of another server, such as Interaction Server 131 of FIG. 1. An agent at station 201 may interact with a customer, for example in a chat session (text-based), leveraging functionality of Interaction server 131, may interact with a customer through instant messaging leveraging functionality, for example, of SIP server 122, or may interact with a customer by email, leveraging functions of Interaction Server 131, which may provide services of an email client. A supervisor with coach and training responsibility for an agent using appliance 201 may likewise interact with a customer or with other agents or knowledge workers using text-based interaction through appliance 202 just as described for an agent using appliance 201.

Collaborative Document Server 203 executes software by processor 204. One function of the software is to provide simultaneous access, display and text editing of a single document for each of an agent using appliance 201 and a supervisor using appliance 202.

Figure 3:
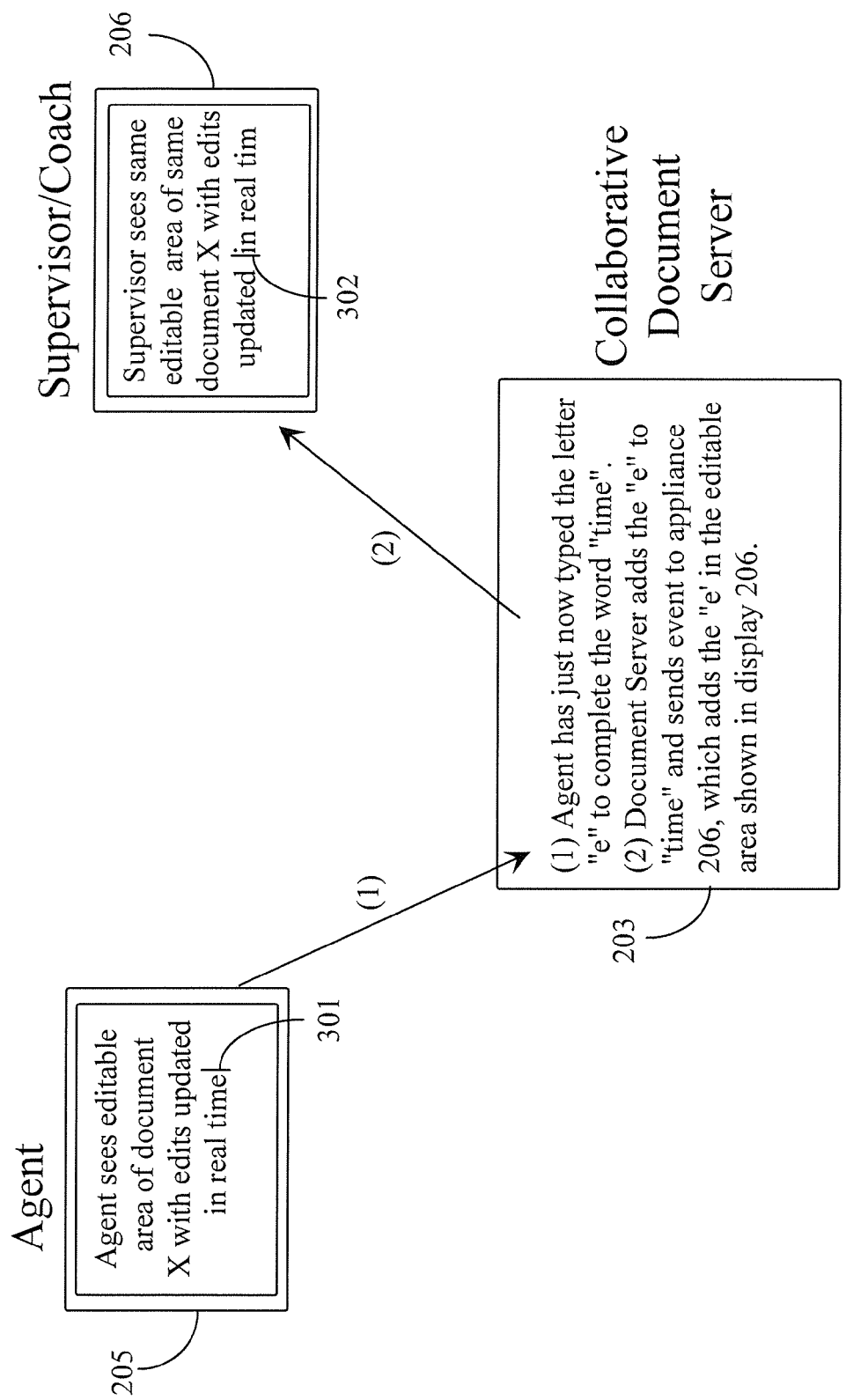
FIG. 3 is a diagram illustrating editing functionality provided to an agent and a supervisor/coach through a Collaborative Document Server.

FIG. 3 is a diagram illustrating editing functionality provided to both an agent using appliance 201 and a supervisor/coach using appliance 202, through Collaborative Document Server 203. In display 205 of appliance 201 there is an editable area for the instant document X showing a sentence ending in "real-time". The agent has just now added "e" to the word "time". As the agent adds the letter notification of the change goes to Collaborative Document Server 203 which adds the "e" to a collaborative version of document X and immediately sends an event to the editing application at appliance 202, which then adds the "e" in the editable area of display 206. The same functionality may work in reverse. That is the supervisor/coach using appliance 202 may edit the document and those edits will propagate in real time to display 205 of appliance 201. It may be seen that text cursor 301 for display 205 is at the end of the word "time" because it must be there for the agent to add the letter. The text cursor 302 in display 206 for the supervisor, however, is before the word "in". It does not matter, as the letter added by the agent will be added at the proper place regardless of the cursor placement. Each party may edit document X and the edits appear in real-time in both documents, or if there are more than two participants, in all of the editable areas in the displays of all of the participants.

This collaborative editing functionality may be especially beneficial for training an agent, because the supervisor/coach will see in his or her own display exactly what the agent enters, and the supervisor/coach may make immediate edits for the instructional benefit of the agent. The agent, for example, may enter a word, and immediately see the word disappear and a better word appear.

In circumstances in which the agent is involved in an interaction with a customer in which the customer may see the characters typed and edited, the customer will not know that some of the edits are being provided by a third person, and may assume that the agent is providing all of the input.

In some implementations Server 203 also maintains context information, such as users involved and participating, current document state, and an audit trail of updates. Updates are received from users and users are notified of changes as the changes occur. All happens in real time.

Figure 4:
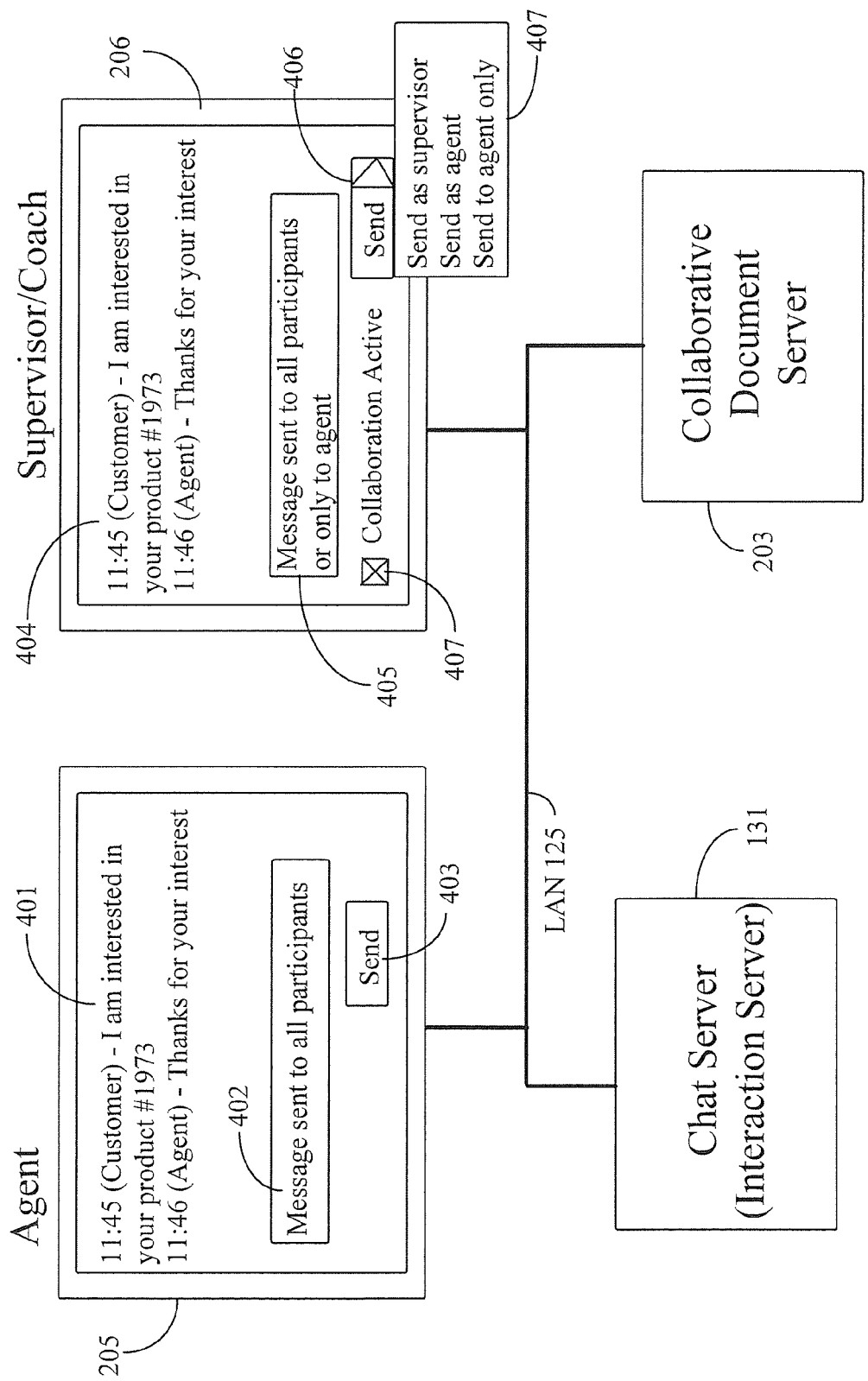
FIG. 4 is a diagram depicting a chat session between an agent and a customer who has been routed to the agent for service.

FIG. 4 is a diagram depicting a chat session between an agent using appliance 201 and a customer who has been routed to the agent for service. Agent's display 205 shows an area 401 where dialogue between the agent and the customer is displayed, a composition field 402 where the agent is enabled to compose the next question or reply he or she wishes to send to the customer, and a send button 403, activation of which sends the composed text in field 402.

A supervisor/coach has a display 206 in which the dialogue in area 401 of the agent's display may be displayed in area 404. The agent's appliance and the coach's appliance are connected through collaborative server 203 described above, in this example by LAN 125, so the chat dialogue may be updated in real time in both displays. The supervisor may by this device monitor the chat dialogue between the agent and the customer.

The supervisor in this implementation has a check box 407, which, by being checked, may initiate collaboration, and, with collaboration active, any message being composed in one of field 402 or 405 is updated in real time in both displays. By this feature the supervisor may correct in real time any message the agent is preparing, while the agent prepares it, which is a real-time feedback to the agent as a learning experience. Further, in this implementation the supervisor has an enhanced Send button providing a drop-down menu with selections for Send as Supervisor, Send as Agent and Send to Agent Only.

If collaboration box 407 is not checked, the supervisor is in listening mode. If the collaboration box is checked the supervisor is active, and may participate in preparation of messages. The supervisor's Send button enables the supervisor to send a message composed in field 405 as though he/she is the agent While the Agent is dealing with a customer interaction, the Supervisor has several ways to get involved. He can be in listen (watch) mode only. In listen/watch mode the supervisor receives all exchanged messages, but does not send anything. The other participants do not know that the supervisor is present. The supervisor may also be in coaching mode. In coaching mode the supervisor may receive all exchanged messages, but can send messages only to the agent, not to the customer. The customer does not know that the Supervisor is engaged in the conversation. The supervisor may also be in Barge-In mode. In this mode the supervisor receives all messages, and all other participants receive his or her messages as well. The Supervisor may get involved in an existing interaction between an agent and a customer, or can ask to get involved in the next interaction for a given agent. In both cases, the supervisor may be involved in the three ways mentioned above.

Chat is employed as an example in the description above, but the same descriptions may apply in similar ways to email preparation and transmission, to message systems, and in general to all sorts of media interaction between an agent and a customer in which the media basis is text.

In various implementations there may be no repeated exchanges between an agent and supervisor. The message to the customer may be constructed in real-time, by both the agent and the supervisor. The learning curve for the agent may be advantageous. A try-and-fail model may be accelerated, as the agent's composition is immediately corrected by the supervisor. The Agent can also see live how the Supervisor is building its message. The model enhances quality of service, because any message sent to the customer is immediately validated by the Supervisor.

There may be further advantages in productivity gains, and in quality of service rendered by the agent. As agent cost is one of the larger operational costs for a contact center, increasing agent productivity may automatically decrease the cost per interaction processed. There may be a faster learning curve for the Agent. Further still, relations with customers may be enhanced because there will be fewer bad messages sent to customers.

In the implementations described above a Collaborative Document Server with certain functions for collaboration has been described providing functionality over a network connection with an agent's computer and a supervisor's computer, each executing, for example, a chat application. This is one architecture in which perhaps a commercially available Collaborative Document Server might be used. In other implementations functionality for collaborative text creation might be coded directly into a chat program, or into other programs that would then provide collaboration as described for the participants.

In some implementations it may be desired to natively implement an instant collaboration capability into the communication software directly. It could be selectively switched on/off, also asymmetrically. For example, the supervisor might have instant collaboration activated for agent owned messages, but not the reverse. Even instant collaboration might be asymmetric, e.g. the supervisor could see immediately what the agent is typing, but if the supervisor is typing the agent might only see an activity indication, and the actual text appears only when released by supervisor. This could be a useful add-on to text communication solutions in general. There are several possibilities.

Several implementations are described above, and it has been noted that the same functionality may be applied to any interaction that is text-based. Further, there may be variations possible in the way functionality is attained, and the scope is limited only by the claims that follow.

What is claimed is:
1. A method, comprising:
  detecting, by a processor, an interaction with a customer appliance;
  displaying, by the processor, content of the interaction at a first agent appliance associated with a first contact center agent and a second agent appliance associated with a second contact center agent;
  detecting, by the processor, composition of a message from the first agent appliance in response to the displayed content;

displaying, by the processor, in real-time with the composition of the message, content of the message being composed on the first and second agent appliances;

detecting, by the processor, a modification to the content of the message being composed from the second agent appliance in response to the displaying of the content of the message; and after detecting the modification, transmitting, by the processor, the message to the customer appliance.

2. The method of claim 1, further comprising, after receiving the modification, displaying, by the processor, the message at the first agent appliance and the second agent appliance.

3. The method of claim 1, wherein the interaction is a text-based communication.

4. The method of claim 3, wherein the text-based communication is a instant message chat.

5. The method of claim 1, further comprising receiving, by the processor, a send message from the second agent appliance to initiate transmitting the message to the customer appliance.

6. The method of claim 1, further comprising receiving, by the processor, a send message from the first agent appliance to initiate transmitting the message to the customer appliance.

7. The method of claim 1, wherein the first agent appliance and the second agent appliance operate in a contact center.

8. The method of claim 1, further comprising:
displaying by the processor, at the second agent appliance, a selection to initiate a collaboration mode between the first agent appliance and the second agent appliance; and
displaying, by the processor, a text field at the second agent appliance for entering the modification to the content of the message.

9. The method of claim 1, further comprising detecting, by the processor, a further modification to the content of the message from the first agent appliance.

10. The method of claim 9, wherein transmitting the message occurs after detecting the further modification.

11. An apparatus, comprising:
a processor; and
a memory coupled to the processor, wherein the memory stores instructions that, when executed by the processor, cause the processor to:
detect an interaction with a customer appliance;
display content of the interaction at a first agent appliance associated with a first contact center agent and a second agent appliance associated with a second contact center agent;
detect composition of a message from the first agent appliance in response to the displayed content;
display in real-time with the composition of the message, content of the message being composed on the first and second agent appliances;
detect a modification to the content of the message being composed from the second agent appliance in response to the displaying of the content of the message; and
after detecting the modification, transmit the message to the customer appliance.

12. The apparatus of claim 11, wherein after receiving the modification, the instructions further cause the processor to display the message at the first agent appliance and the second agent appliance.

13. The apparatus of claim 11, wherein the interaction is a text-based communication.

14. The apparatus of claim 13, wherein the text-based communication is a instant message chat.

15. The apparatus of claim 11, wherein the instructions further cause the processor to receive a send message from the second agent appliance to initiate transmitting the message to the customer appliance.

16. The apparatus of claim 11, wherein the instructions further cause the processor to receive a send message from the first agent appliance to initiate transmitting the message to the customer appliance.

17. The apparatus of claim 11, wherein the first agent appliance and the second agent appliance operate in a contact center.

18. The apparatus of claim 11, wherein the instructions further cause the processor to:
display, at the second agent appliance, a selection to initiate a collaboration mode between the first agent appliance and the second agent appliance; and
display a text field at the second agent appliance for entering the modification to the content of the message.

19. The apparatus of claim 11, wherein the instructions further cause the processor to detect a further modification to the content of the message from the first agent appliance.

20. The apparatus of claim 19, wherein transmitting the message to the customer appliance corresponding to the interaction occurs after detecting the further modification.

\* \* \* \* \*